United States Patent
Budde et al.

(10) Patent No.: US 6,490,559 B2
(45) Date of Patent: *Dec. 3, 2002

(54) MEMORY HAVING SPEECH RECOGNITION SUPPORT, BY INTEGRATED LOCAL DISTANCE-COMPUTATION/REFERENCE-VECTOR-STORAGE, FOR APPLICATIONS WITH GENERAL-PURPOSE MICROPROCESSOR SYSTEMS

(75) Inventors: Wolfgang O. Budde, Aachen (DE); Volker Steinbiss, Aachen (DE)

(73) Assignee: Koninklijke Philips Electronics N.V., Eindhoven (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 33 days.

(21) Appl. No.: 09/170,464

(22) Filed: Oct. 13, 1998

(65) Prior Publication Data

US 2002/0007274 A1 Jan. 17, 2002

(30) Foreign Application Priority Data

Oct. 10, 1997 (DE) .......................................... 197 44 690

(51) Int. Cl.[7] .............................................. G10L 15/10
(52) U.S. Cl. ...................................... 704/238; 704/239
(58) Field of Search .................................. 704/238, 239

(56) References Cited

U.S. PATENT DOCUMENTS

| | | | | |
|---|---|---|---|---|
| 4,620,316 A | * | 10/1986 | Yasue et al. ................. | 704/231 |
| 5,014,327 A | * | 5/1991 | Potter et al. ................. | 382/220 |
| 5,027,407 A | * | 6/1991 | Tsunoda ....................... | 704/239 |
| 5,216,748 A | | 6/1993 | Quenot et al. ............... | 704/200 |
| 5,459,798 A | * | 10/1995 | Bailey et al. ................. | 382/218 |
| 5,581,485 A | | 12/1996 | Van Aken ..................... | 364/561 |

FOREIGN PATENT DOCUMENTS

| | | | |
|---|---|---|---|
| DE | 3239171 A1 | 5/1983 | ............. G10L/1/10 |
| DE | 3829032 A1 | 7/1990 | ............. G11C/7/00 |
| DE | 68914958 T | 6/1994 | ............. G10L/5/06 |
| EP | 0295876 A2 | 12/1988 | ............. G06K/9/64 |
| WO | WO9533259 | 12/1995 | ............. G10L/5/06 |

OTHER PUBLICATIONS

Sung–Nam Kim, et al. "A VLSI Chip for Isolated Speech Recognition System," IEEE Trans. Consumer Electronics, vol. 42, No. 3, p. 458–467, Aug. 1996.*

* cited by examiner

Primary Examiner—Tālivaldis I. Šmits
(74) Attorney, Agent, or Firm—Daniel J. Piotrowski

(57) ABSTRACT

The distance computation represents a central, constantly recurrent task in sample and speech recognition. It is used in speech recognition as a degree of similarity between a part of a speech utterance and a speech reference. In picture processing and sample recognition, it is used for data compression. The distance computation requires the longest computation time so that a reduction of the computation time results in a considerable efficiency improvement. A reduction of the computation time is achieved by the integration of the distance computation in a memory module in which particularly the reference data are stored. Due to this integration, the other components of the overall system are relieved of this constantly recurrent task and are available for more complex processes in this period of time. This integration makes the distance computation essentially shorter because the communication between memory sections and computation unit takes place directly without utilizing a busy system.

9 Claims, 2 Drawing Sheets

MEMORY HAVING SPEECH RECOGNITION SUPPORT, BY INTEGRATED LOCAL DISTANCE-COMPUTATION/REFERENCE-VECTOR-STORAGE, FOR APPLICATIONS WITH GENERAL-PURPOSE MICROPROCESSOR SYSTEMS

BACKGROUND OF THE INVENTION

The invention relates to a speech recognition computer comprising a microprocessor, input and output interfaces and a data bus, in which incoming test signals converted into a digital form are subdivided into segments, and test vectors are assigned to properties of the segments, for which test vectors a distance with reference to reference vectors is computed.

The distance computation is used in speech recognition as a degree of similarity between a part of a speech utterance and a speech reference and represents a central, constantly recurrent task in sample and speech recognition. It requires the longest computation time so that a reduction of the computation time yields a considerable efficiency improvement. In picture processing and sample recognition, it is used for data compression (MPEG).

Up to now, additional, special hardware modules have been used for speech recognition. These modules are used for converting the incoming analog speech signals into digital signals, and for feature extraction in which the characteristic properties of the segmented incoming digitized speech signal are assigned to corresponding vector components. For the test vectors thus formed, the distance to the reference vectors is computed by means of a digital signal processor.

On the other hand, there are software-based speech recognition systems in which the recognition process is performed without any special hardware, i.e. with the system components of a universal computer. The incoming test signals are digitized on, for example, the sound card. The elaborate distance computation is performed on the main processor of the system. This presupposes the use of a very powerful processor and also requires a considerable part of its computation power which is then no longer available for other processes. Generally, the recognition of the spoken text is, however, realized in an off-line mode because a sufficiently powerful processor is not often available.

SUMMARY OF THE INVENTION

It is an object of the invention to provide a (universal) arrangement which allows a faster computation of the distances.

This object is solved in that a distance computer and a memory module are provided which are integrated on a common module having at least a data terminal for supplying test vectors and reference vectors and for providing computed distances.

This universal computer system according to the invention allows speech recognition with a conventional microprocessor and its customary peripheral equipment by combination with a memory and an integrated distance computer. The microprocessor is thereby relieved from the elaborate distance computation and its computing power is available for other processes.

To this end, analog data are applied to the computer system via the input and output interfaces, which data, after having been prepared for distance computation, are applied to the memory module with the integrated distance computer.

An additional advantage is the short communication path. Since the data to be compared are directly supplied from the relevant memories to the distance computer, no valuable computation time is lost. The system transfers the test vectors and receives the computed distances. Since the distance computation is locally performed within a memory module, all components of the system, with the exception of the relevant memory module, are available to the system processor for other processes.

Moreover, this integration does not require any data transfers via an external data or address bus for performing the distance computation, i.e. the memory accesses are limited to the internal local memory ranges so that the distance computation is performed directly and within a significantly shorter time. The reference data are loaded into the reference data memory before or at least not during a recognition process step. Also a possible update of this reference data file is performed at non-critical points of time.

A further advantage of this computer system is the possible reconstruction of a computer conceived for normal purposes. A conventional memory module is exchanged for a memory module with an integrated distance computer. This enables the computer system to perform speech recognition processes without any serious limitation of its efficiency.

The integration of a distance computer in a memory module involves further advantages of the optimized memory manufacturing process. Memory modules are produced as logic modules with a higher density of components, resulting in a more optimal utilization of space.

The effectiveness of this integration will be shown by way of an example. In a typical case, the distances of a test vector to, for example, 2000 reference vectors are required every 16 ms. Approximately a data rate of at least 3 Mbyte per second is required for this purpose. A standard signal processor with a clock frequency of 20 MHz would need approximately 12 ms for this purpose. A standard microprocessor requires much more time for this purpose. By integrating the distance computation, this task, performed at the same clock frequency, is reduced to approximately one tenth, i.e. approximately 1.2 ms. The speed gain relates to the optimized addressing, the compact data storage and the shorter data path.

These and other aspects of the invention are apparent from and will be elucidated with reference to the embodiments described hereinafter.

DESCRIPTION OF THE PREFERRED EMBODIMENTS

Figure 1:
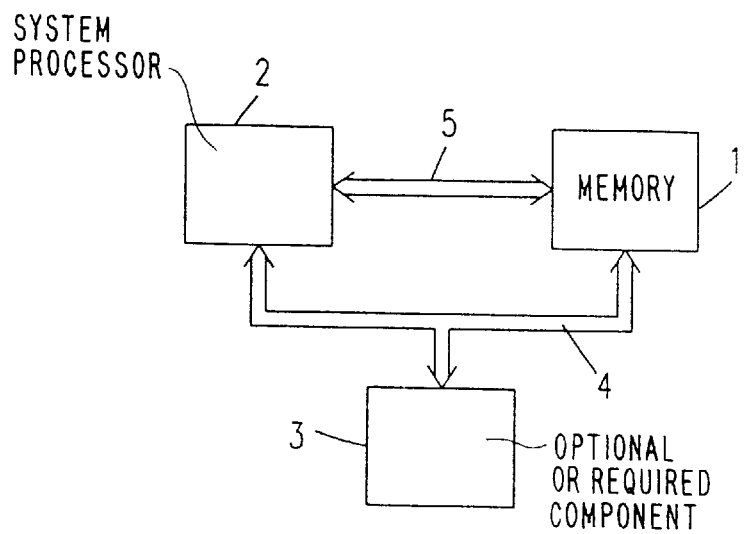
FIG. 1 shows the integration of the distance computation in a computer system.

FIG. 1 shows the principal structure of a computer system. The Figure shows the memory with integrated distance computation 1, the system processor 2 and all further required or optional components as unit 3. The connections between said elements 1 to 3 are established via the data or address bus 4. An initialization of the distance computation 1 is performed via control lines 5. Incoming test signals are applied via interfaces in unit 3 to the overall system. These signals are converted in accordance with the type of signal and subdivided into segments. Components of a test vector are assigned to the different properties of a segment. A test vector is applied to the memory with integrated distance computation 1 via the bus 4. The distance computation between this test vector and at least a part of the reference data is performed in this memory with integrated distance computation 1, and the computed distances are applied for further processing to the overall system via the bus 4.

Figure 2:
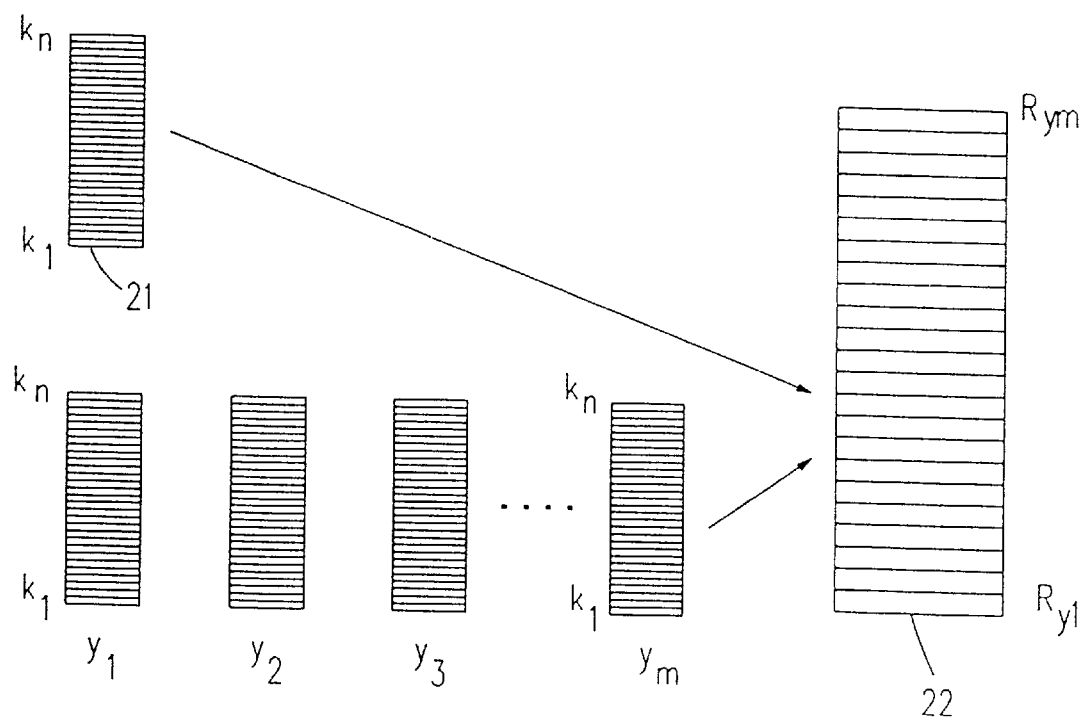
FIG. 2 shows the formation of the distance between reference vectors and test vectors.

FIG. 2 shows a test vector 21 consisting of a plurality of components k in The reference vectors $y_1$ to $y_m$ consist of the same number of components $k_n$ as the test vector 21. The components $k_n$ of these vectors comprise properties of the speech signal parts to be compared. The components $k_1$ to $k_n$ of the test vector 21 are compared with the components $k_1$ to $k_n$ of at least a part of the reference vectors $y_1$ to $y_m$. For the distance computation, the partial distances $r_n$ of the component values of the test vector 21 are formed with the corresponding component values of the considered reference vectors $y_1$ to $y_m$. The computed partial distances $r_n$ of the components $k_n$ of a reference vector $y_1$ to $y_m$ are directly included in a distance $R_{ym}$ by way of summation. For forming the distance $R_{ym}$, distance computations in accordance with, inter alia, Gauss or Laplace are fundamentally possible. This distance $R_{ym}$ represents a degree of similarity of the reference vector $y_1$ to $y_m$ with the test vector 21. The distances $R_{y1}$ to $R_{ym}$ are stored in a list 22, with the number of distances $R_{ym}$ depending on the number of reference vectors $y_1$ to $y_m$ which are compared with the test vector 21. FIG. 2 shows that a very large number of computations is required to compare the components $k_n$ of the test vector 21 with the relevant components $k_n$ of the reference vectors $y_1$ to $y_m$. Additionally, the distance $R_{ym}$ must be computed from the partial distances $r_n$ for each reference vector $y_1$ to $y_m$. A very long computing time is required for this large number of simple, constantly recurrent computations which, moreover, should be realized within a very short time.

Figure 3:
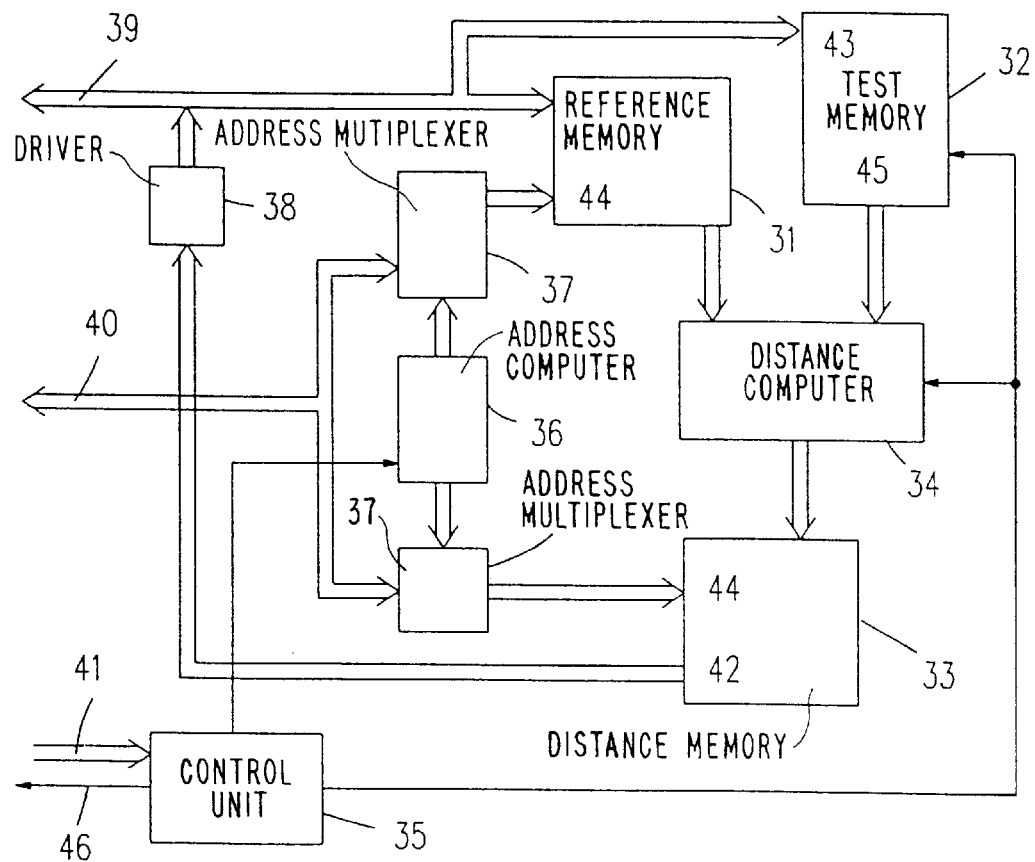
FIG. 3 shows the internal structure of a memory with integrated distance computation.

FIG. 3 shows the internal structure of a memory module according to the invention. This memory module includes a reference memory 31 and a test memory 32 which are connected to a distance computer 34. This computer is coupled to a distance memory 33 which applies computed distances via the data output 42 and a driver 38 to the data terminal 39 and, via this connection, to a bus 4 (FIG. 1) to the system for further processing. Furthermore, this memory module comprises an address computer 36, address multiplexers 37 and a control unit 35.

Before a recognition process step, the reference memory is loaded with reference vectors via the data terminal 39. The test memory 32 receives the test vectors at the data input 43 also via the data terminal 39. The reference vectors to be compared and the relevant test vector are applied to the distance computer 34. In the distance computer 34, each reference vector and the test vector are compared with each other and the mutual distances between the components are formed. The distances between the compared vectors are stored in a distance memory 33.

The test memory 32 is implemented as a ring memory and is loaded with the test vector at the start of each distance computation by the system processor. The component to be currently compared is made available by means of a shifting process at the data output 45 of the test memory 32. Another possibility is to increment the current address of the component to be considered. The test memory has such a structure that, after a complete comparison of all components of the test vector with all components of a reference vector, the test vector is again available in its initial form in the test memory, or the current address is that of the first component of the test vector.

After a partial distance to the corresponding component of a reference vector is formed for each component of a test vector and a distance is formed from their combination, a subsequent reference vector is compared with the test vector. Both the reference memory 31 and the distance memory 33 are addressed via address multiplexers 37. The address multiplexers 37 apply the addresses, made available by the address computer 36, via address inputs 44 to the reference memory 31 and/or to the distance memory 33. The address for the distance memory can be most easily derived from the address for the reference memory by omitting the address lines required for addressing the individual vector components. The address multiplexers 37 enable the reference memory 31 and the distance memory 33 to be also addressed externally via the address terminal 40 which is connected to the external bus 4 (FIG. 1). The control unit 35 is initialized by the system via control lines 41 and takes over the control of the address multiplexers 37, the distance computer 34 and the test memory 32. After the distance computation has been performed, the control unit 35 indicates by means of the status line 46 to the system that the distances $R_{ym}$ are available.

The reference memory 31 may also be loaded with reference vectors via an $I^2C$ interface. Via this double-wire terminal, the reference memory 31 may also be loaded with reference vectors in the off-line state, or the data file may be updated. The reference memory 31 may be implemented as an EEPROM so that the reference vectors need not be loaded whenever the memory is switched on. The reference vectors are not transferred to the reference memory 31 during a recognition process step. Thus, this loading process does not require any computation time during the recognition process step. After the relevant test vector has been loaded via the data terminal 39, the recognition process step starts, computing the distances between this test vector and the reference vectors loaded in the reference memory 31. The computed distances are read by the system from the distance memory 33 via the data terminal 39, and are further processed.

What is claimed is:

1. A memory module for a speech recognition system for use in a computer system, the memory module comprising:
   a first memory for storing a plurality of reference vectors and a test vector,
   a distance computer which is coupled to the first memory so as to locally compute distances between reference vectors and the test vector,
   a distance memory for storing the computed distances.

2. The memory module of claim 1, wherein the memory module is removable from the computer system, thereby also removing the speech recognition system.

3. The memory module of claim 1, wherein memory accesses for a distance computation are limited to internal local memory ranges of the memory module.

4. A computer system for speech recognition, comprising a microprocessor, input and output interfaces and a data bus, in which incoming test signals converted into a digital form are subdivided into segments, and test vectors are assigned to properties of the segments, for which test vectors a distance with reference to reference vectors is computed, characterized in that a distance computer is integrated into a memory module having at least a data terminal for supplying test vectors and reference vectors to the memory module and for providing locally computed distances by means of a distance memory and an address multiplexer on the memory module.

5. A system as claimed in claim 4, characterized in that the memory module comprises a reference memory for plurality of reference vectors, a test memory for a test vector, a distance computer which is coupled to the reference memory and the test memory so as to compute distances between reference vectors and the test vector, a distance memory for storing the computed distances which are supplied via a data terminal or bus, an address computer for computing addresses at least for the reference memory and the distance memory, a control unit for communication with external input and output elements via control lines, and a status line for controlling the address computer, the distance computer and the test memory.

6. A system as claimed in claim 4, characterized in that the memory module comprises the distance computer and a test memory for storing the test vector, whereby the test memory is implemented as ring memory and whose contents circulate once during complete read-out of a reference vector from the reference memory.

7. A system as claimed in claim 4, characterized in that the memory module has an address terminal, which is controlled by a control unit and connected via address multiplexers to an address input of the distance memory and/or the reference memory.

8. A system as claimed in claim 4, characterized in that the reference data memory is implemented as an EEPROM and is loadable with new reference data in form of reference vectors.

9. A system as claimed in claim 4, characterized in that the memory module is supplying the computed distances to the microprocessor, which are computed by summing up partial distances between components of the test vector in a test vector memory and components of at least a part of the reference vectors in a reference memory.

* * * * *